Sept. 12, 1933.  C. HEDDON  1,926,720
ARTIFICIAL BAIT
Filed Feb. 29, 1932
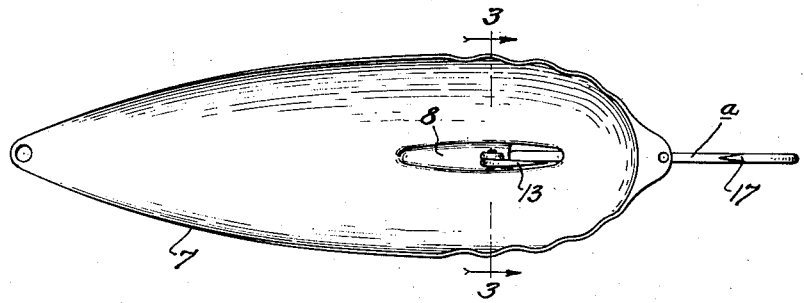
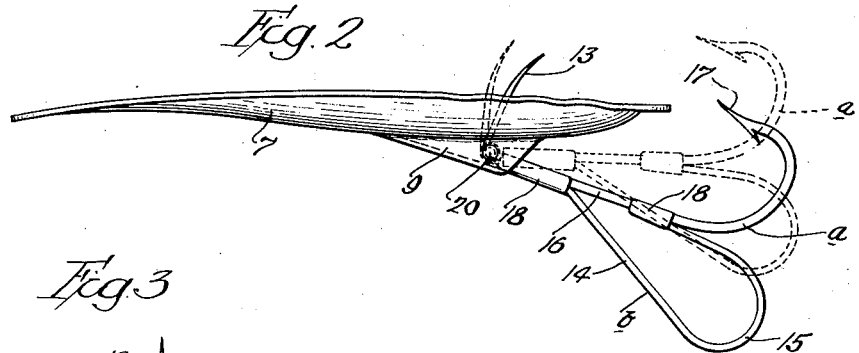
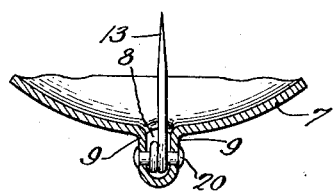
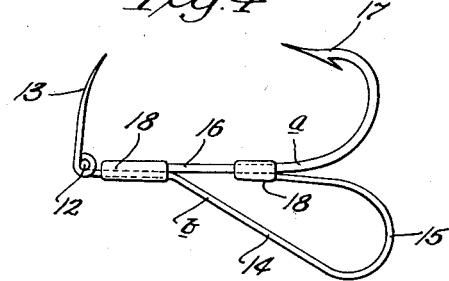
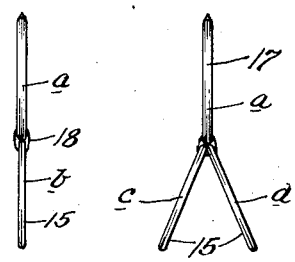
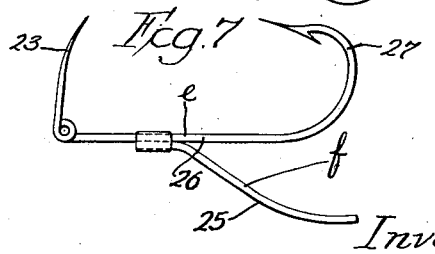
Inventor:
Charles Heddon
by Banning & Banning
Attys.

Patented Sept. 12, 1933

1,926,720

UNITED STATES PATENT OFFICE 1,926,720

ARTIFICIAL BAIT

Charles Heddon, Dowagiac, Mich., assignor to James Heddon's Sons, Dowagiac, Mich., a corporation of Michigan Application February 29, 1932. Serial No. 595,828

8 Claims. (Cl. 43—39)

This invention which relates to artificial baits is concerned with a novel construction of bait body together with a pivoted hook mounting, and means for depressing the hook as required to avoid fouling with aquatic vegetation or other obstructions during retrieving or trolling.

In the drawing wherein is depicted an illustrative embodiment of my invention—

Figure 1 is a view in plan of a bait in the form of a spoon to which is pivotally attached a depressible hook;

Fig. 2 is a side elevation of the bait;

Fig. 3 is a transverse section through the bait on line 3—3 of Fig. 1;

Fig. 4 is a detail in elevation of the hook;

Fig. 5 is an end elevation thereof;

Fig. 6 which is a view similar to Fig. 5 shows a modification in the construction of the hook; and Fig. 7 shows a further modification in the hook construction.

By way of example, I have shown in the drawing a bait in the form of a shallow spoon 7 formed centrally of its body, and slightly aft of its longitudinal center, with a depressed channel 8 on the opposite sides of which are walls 9 integral with the spoon. This channel tapers downwardly from its forward end which merges with the spoon body, the rear end of the channel being open to permit the insertion therethrough of one end of the hook which will now be explained. The spoon bowl decreases gradually toward the front end of the bait, which is flat over a substantial portion of its surface, is tapered somewhat toward a point, and is inclined slightly downwardly, as shown in Figs. 1 and 2.

Referring particularly to Fig. 4, the hook for convenience in manufacture comprises upper and lower wires $a$ and $b$, respectively, the latter being coiled around near its forward end to produce an eye 12 above which the wire continues upwardly with a slight rearward bend to provide a trigger 13 which is preferably pointed. In the form shown, the lower wire proceeds rearwardly of the eye first straight, then downwardly at a slight angle as at 14, and finally executes an upward bend to form a loop or dummy 15. Arranged over the lower wire is the upper wire formed to provide a shank 16 whose rearward end is curved around to form a forwardly facing hook 17. The shank may be rested upon the lower wire at two places as along the straight portion proximate to the eye 12 and along the forwardly directed end of the dummy 15. At each of these places of contact a rigid connection is made as by brazing 18.

In the construction of Fig. 6 exactly the same construction is illustrated, except that here I employ two lower wires $c$ and $d$ having downwardly inclined portions terminating in dummies 15 angularly related to each other and to the hook 17 forming a broad base in relation to the pointed end of the hook. A further modification is suggested in Fig. 7 wherein a single wire $e$ is utilized for a trigger 23, shank 26 and hook 27, together with a second wire $f$ connected to the first and extending rearwardly therefrom to form one or more dummies 25, pointed or otherwise.

A hook of the general kind described is adapted for pivotal association with the bait body by introducing the forward end of the hook through the rear open end of the channel with the trigger upwardly extended from the body of the bait. As by means of a pin 20 passed through the eye 12 with its ends supported in the channel walls, the hook may be loosely pivoted to swing vertically. The upper limit of this swinging movement is reached when the hook shank abuts the underside of the bait body, as suggested by the dotted lines in Fig. 2, and the lower limit is reached when the wire portion adjacent the eye 12 descends sufficiently to engage with the bottom of the channel at its open rear end.

The contour of the present bait is such that it offers a minimum of resistance to atmosphere during casting. This is due largely to the formation in the spoon of a shallow bowl which flattens out gradually at the forward end. This same feature, plus the pointed forward end of the spoon, contributes to easy travel of the bait through the water, and through grass or other vegetation. The tendency of a bait to rise to the surface, due to the preponderance of weight at the rear, is overcome by the slight downward curvature of the flattened forward end of the bait.

The hook assembly, i. e. the trigger, dummy and hook proper, is so constructed both in relation to its own components and to the bait with which it is associated, as to achieve very satisfactory results. The trigger which is normally upstanding at a point near the rear end of the bait, is curved slightly to the rear and desirably pointed. When encountering an obstruction, the trigger is rocked back with a consequent depression of the hook. The action is thus automatic. This movement of the trigger in a rearward direction facilitates dumping or unloading of any engaged obstruction, such as aquatic vegetation.

It is important to note also the relationship of the trigger to the hook and dummy and to the portion of the bait which lies to the rear of the trigger. If a fish attacking laterally or from behind should seize the rear portion of the bait, the depending dummy is in position to be engaged by the lower jaw with the result that the hook will be driven home when the jaws are closed. Due to this relative movement between the bait and hook assembly, the hook is brought to a position for engagement with the upper jaw. It will be noted, therefore, that even though the point of the hook trails right behind the bait in a protected position, the hook point will at once be raised to impale the fish in response to an attack, as described.

The provision of one or more dummies is highly desirable. As shown in Fig. 5, a single wire bent into the form of a loop below the hook may suffice. The construction shown in Fig. 6 is also advantageous in that two angularly disposed dummies, providing a broad base, are depended below the hook. In the event that a fish swimming partly on its side, or attacking laterally, should take the hook into his mouth at an angle, one of the dummies is so positioned as to prevent turning of the bait to a sidewise position within the mouth of the fish. As suggested in Fig. 7, the dummy may take other forms, as, for example, an angularly depending wire having its rear end exposed and optionally pointed. In this construction, the dummy co-operates, as before, in driving the hook point home when the fish jaws are closed.

The pivotal mounting of the hook is also important. As shown it is loosely confined between the two walls of the channel 8 so as to be guided thereby in its vertical swinging movements. This mounting, however, should be sufficiently loose to relieve the bait body of inertia so that the latter may have entire freedom in side movements. This lateral play is desirable in order that the hook may trail slightly but freely to either side as required for the ready attainment of a swimming motion by the bait at the start of its travel. Once it acquires such a swimming motion, the bait will travel with the same movement continuing.

The essence of my invention resides (1) in a pivoted hook movable to positions in which it is exposed both to obstructions and to seizure by a fish, and in which it is protected therefrom; (2) in the provision of means for moving the hook automatically from one position to another; and (3) in the provision of one or more dummies which force the hook home within the mouth of a fish when the latter bites or strikes the hook in the usual way. These several features of novelty, as shown and described, may all be combined into a single structure for association with a conventional bait, here shown as a spoon, but may also be selectively used with advantage with any type of bait to which they are susceptible of application.

I claim:

1. A fish bait including a body to which is pivotally joined a vertically swinging hook having a forwardly facing pointed end movable between a protected position and one wherein the hook point is exposed above the bait body, and other means engageable by an obstruction for automatically shifting the hook from such exposed position.

2. A fish bait including a body to which is attached a hook having a forwardly facing pointed end movable between a protected position and one wherein the hook point is exposed above the bait body, and means rigid with the hook extending away therefrom and adapted, when engaged by an obstruction, to move the hook to protected position.

3. A fish bait including a body to which is attached a hook movable to two positions in one of which it is exposed and in the other of which it is protected, means rigid with the hook extending away therefrom and adapted, when engaged by an obstruction, to move the hook to protected position, and other means connected with the hook acted upon by water pressure tending to move the hook to exposed position.

4. In combination, a bait body mounting a movable hook and providing therefor a guard for its point when the hook is in one position, and means forming part of the hook normally exposed to engagement by obstructions in the water adapted, upon such engagement, to move the hook to the aforesaid position in which the hook point is guarded from such obstruction.

5. A fish bait comprising a body in the form of a spoon in the hollow of which is an opening bordered by depending walls forming a mounting for the hook having its shank extended through the open end of the channel for pivotal connection therewithin, and its forward end extended upwardly through the spoon for exposure upon the upper side thereof.

6. A fish bait including a body in the form of a spoon having throughout its rear portion a shallow bowl of gradually reducing depth in a forward direction terminating in a flattened portion inclined slightly downwardly at the forward end of the body, a hook pivotally mounted centrally of the bait for vertical swinging movement, and means for maintaining the hook in a rearwardly extended position.

7. A fish bait including a body in the form of a spoon, a hook pivotally mounted centrally of the bait for vertical swinging movement, means for maintaining the hook in a rearwardly extended position, and a formation at the forward end of the spoon acted upon by pressure of water for resisting upward travel of the bait during movement through the water.

8. A fish bait including a body to which is pivotally attached the shank of a hook having a forwardly directed point, and a dummy connected with the shank extending laterally therefrom in a direction away from the hook point, the dummy being extended forwardly and laterally to provide a trigger which lies ahead of the hook point in spaced relation thereto.

CHARLES HEDDON.